United States Patent
Chiu et al.

(10) Patent No.: US 12,071,553 B2
(45) Date of Patent: Aug. 27, 2024

(54) WHITE INKJET INK COMPOSITION HAVING IMPROVED RESIN COMPATIBILITY

(71) Applicant: Inner Mongolia Xianhong Science Co., Ltd., Inner Mongolia (CN)

(72) Inventors: Kwan Yeung Chiu, Hong Kong (CN); Kin Man Ho, Hong Kong (CN); Chun Ho Yam, Hong Kong (CN); Siu Sun Chan, Hong Kong (CN); Kwai Sang Ng, Hong Kong (CN)

(73) Assignee: Inner Mongolia Xianhong Science Co., Ltd., Inner Mongolia (CN)

( * ) Notice: Subject to any disclaimer, the term of this patent is extended or adjusted under 35 U.S.C. 154(b) by 265 days.

(21) Appl. No.: 17/141,247

(22) Filed: Jan. 5, 2021

(65) Prior Publication Data
US 2022/0213339 A1    Jul. 7, 2022

(51) Int. Cl.
*C09D 11/322*   (2014.01)
*B41J 2/01*    (2006.01)
(Continued)

(52) U.S. Cl.
CPC ............ *C09D 11/322* (2013.01); *B41J 2/01* (2013.01); *C08F 222/08* (2013.01); *C08K 3/22* (2013.01);
(Continued)

(58) Field of Classification Search
CPC ..... C09D 11/322; C09D 11/38; C09D 11/106; C09D 11/107; C09D 11/14; C09D 11/36;
(Continued)

(56) References Cited

U.S. PATENT DOCUMENTS

| | | | |
|---|---|---|---|
| 3,528,935 A | 9/1970 | Rusnack et al. |
| 5,603,865 A | 2/1997 | DePue et al. |
| | (Continued) | |

FOREIGN PATENT DOCUMENTS

| | | |
|---|---|---|
| CN | 104059428 B | 9/2014 |
| JP | H0834953 A | 2/1996 |
| | (Continued) | |

OTHER PUBLICATIONS

T. Elder, "Chemicals from Wood", Editor(s): Jeffery Burley, Encyclopedia of Forest Sciences, Elsevier, 2004, p. 607, ISBN: 9780121451608, https://doi.org/10.1016/B0-12-145160-7/00057-0. (Year: 2004).*
(Continued)

*Primary Examiner* — Jennifer A Smith
*Assistant Examiner* — Jeffrey Eugene Barzach
(74) *Attorney, Agent, or Firm* — Kam Wah Law

(57) ABSTRACT

This invention relates to a white inkjet ink composition having improved compatibility of functional polymer-stabilized titanium dioxide with binder resins, resulting in significantly slowing down the sedimentation rate, resisting clogging nozzles upon jetting, and enhancing the lightness of the ink coating. The white inkjet ink composition comprises a white colorant; one or more binder resins; one or more compatibilizers; an ink solvent; and optionally one or more additives. The white colorant is modified with a functional copolymer comprising an acid group, such as such as styrene-maleic anhydride, to form a modified white colorant. The presence of the one or more compatibilizers significantly improve the compatibility of the modified white colorant, such as styrene-maleic anhydride stabilized titanium dioxide, with the one or more binder resins.

19 Claims, 3 Drawing Sheets

(51) Int. Cl.
*C08F 222/08* (2006.01)
*C08K 3/22* (2006.01)
*C08K 9/08* (2006.01)
*C09D 11/38* (2014.01)

(52) U.S. Cl.
CPC ............. *C08K 9/08* (2013.01); *C09D 11/38* (2013.01); *C08K 2003/2241* (2013.01); *C08K 2003/2296* (2013.01); *C08K 2201/003* (2013.01)

(58) Field of Classification Search
CPC . B41J 2/01; C08F 222/08; C08K 3/22; C08K 9/08; C08K 2003/2241; C08K 2003/2296; C08K 2201/003
See application file for complete search history.

(56) References Cited

U.S. PATENT DOCUMENTS

| | | |
|---|---|---|
| 5,948,842 A | 9/1999 | Araki et al. |
| 5,948,843 A | 9/1999 | Boutiere et al. |
| 6,406,143 B1 | 6/2002 | Chen et al. |
| 8,097,076 B2 | 1/2012 | Gobelt et al. |
| 8,129,476 B2 | 3/2012 | Gobelt et al. |
| 8,702,219 B2 | 4/2014 | Vasudevan |
| 9,133,357 B2 | 9/2015 | Sasada et al. |
| 9,416,280 B2 | 8/2016 | Richards |
| 2007/0129463 A1 | 6/2007 | Ma et al. |
| 2012/0283376 A1 | 11/2012 | Shu et al. |
| 2018/0155561 A1 | 6/2018 | Li et al. |
| 2020/0199388 A1* | 6/2020 | Kyriacou ............... C09D 11/03 |
| 2021/0388224 A1* | 12/2021 | Mizushima .......... C09D 11/104 |

FOREIGN PATENT DOCUMENTS

| | | | |
|---|---|---|---|
| JP | 2006028252 A | 2/2006 | |
| JP | 2014214255 A | * 11/2014 | .............. B41M 5/00 |

OTHER PUBLICATIONS

English Machine Translation of JP2014214255A ("Machine_Translation_Fujiwara_JP_2014214255_A") (Year: 2014).*
Henry F., Marchal P., Bouillard J., Vignes A., Dufaud O., Perrin L., 2013, The Effect of Agglomeration on the Emission of Particles from Nanopowders Flow, Chemical Engineering Transactions, 31, 811-816. (Year: 2013).*
"Zeta Potential." Anton Paar, Apr. 25, 2020, wiki.anton-paar.com/en/zeta-potential/. (Year: 2020).*
Chinese Examination Report issued for the Chinese Application No. 202110085517.5 on Jul. 18, 2022.
Ou Yang Zhen Tu, "The Use of Cellulose Acetate in Coatings," Guangdong Chemical, Dec. 15, 2003, pp. 34-35.
Translation_of_JP2006028252A.
Translation_of_JPH0834953A.
Translation_of_the_Abstract_of_CN104059428B.

* cited by examiner

WHITE INKJET INK COMPOSITION HAVING IMPROVED RESIN COMPATIBILITY

FIELD OF THE INVENTION

This invention relates to a white inkjet ink composition comprising a white colorant; one or more binder resins; one or more compatibilizers; an ink solvent; and optionally one or more additives. The white colorant is modified with a functional copolymer comprising an acid group, such as styrene-maleic anhydride, to form a modified white colorant. The presence of the one or more compatibilizers significantly improve the compatibility of the modified white colorant with the one or more binder resins.

BACKGROUND OF THE INVENTION

White inkjet inks have been widely used in a variety of applications such as marking, labelling, visual arts, paint, undercoating, and so on. Inorganic pigments such as titanium dioxide ($TiO_2$) and zinc oxide (ZnO) have been widely used as white colorants for the white inkjet inks because they have a considerably high refractive index, thereby a high hiding power.

When prints or ink coatings are produced through printing by an inkjet printer using a white inkjet ink composition comprising a titanium dioxide white pigment, a binder, and a solvent, the pigment may quickly settle out from the ink due to its high specific gravity relative to the solvent and the low viscosity requirement of the inkjet ink composition (generally from 2 to 20 centipoise). This sedimentation problem is even worse if the surfactant does not efficiently stabilize the pigment in the inkjet ink composition and/or the compatibility between the surfactant-stabilized pigment particles and the binder is poor. Upon sedimentation, as particle-particle attraction is getting larger with time. When the attractive force is higher than the repulsive forces between the particles, the pigment particles tend to aggregate, leading to precipitation and finally clogging of printer nozzle. As a result, the print quality is poor, and the degree of whiteness is low.

Various types of surfactants, dispersants and coupling agents have been used for stabilizing the titanium dioxide pigment particles in an aqueous or a non-aqueous medium. They include succinic anhydride-functionalized polymers (see U.S. Pat. Nos. 8,097,076 B2 and 8,129,476 B2), acid-functionalized polymers (see U.S. Patent No. US20070129463A1), organosilanes, organometallic coupling agents, and the like. Among these, styrene-maleic anhydride (SMA) copolymers have been proven as an effective surfactant or dispersant in stabilizing titanium dioxide in an organic or aqueous dispersion because the succinic anhydride moiety in SMA copolymers has a high affinity to the pigment surface, which helps SMA copolymers to anchor efficiently on the pigment surface and thus stabilize the pigment in the inkjet ink composition (see Applied Plastics Engineering Handbook, 2011, Chapter 25). All of the above-mentioned patents and article are incorporated herein by reference.

Some non-limiting examples of white inkjet ink compositions using SMA copolymers include those disclosed in U.S. Pat. Nos. 5,603,865, 5,948,842, 6,406,143, 9,133,357, 8,702,219, and 9,416,280; U.S. Patent Application Publication No. 2012/0283376; Chinese Patent No. 104059428; and Japanese Patent No. 2006028252A, all of which are incorporated herein by reference. The inkjet ink compositions disclosed by above-mentioned patents generally have good dispersion stability, stable color concentrates, good ink flow and improved gloss of the ink coating.

Despite of the success of their approaches using SMA copolymers to disperse and stabilize titanium dioxide in inkjet ink compositions, SMA-stabilized titanium dioxide pigment dispersion often results in poor compatibility with other binder resins (see Japanese Patent No. 0834953A and U.S. Pat. No. 3,528,935), due to the poor compatibility between the polystyrene segment from the SMA copolymer and the binder resins (see Robert J Young, Peter A. Lovell, Introduction to Polymers, CRC Press, p. 450), leading to phase separation within an hour. Such poor compatibility of the SMA-type surfactants limits the application of using other functional binders to confer the ink coating with desirable mechanical properties to meet the special requirements such as adhesion or abrasion resistance.

U.S. Pat. No. 6,406,143 discloses a graft copolymer of styrene-maleic anhydride reacted with a poly(ethylene-co-propylene oxide). The graft copolymer is described as suitable for use as a dispersant in a water-based inkjet ink composition. U.S. Pat. No. 5,948,843 relates to a lithographic printing ink containing a dispersing agent of a reaction product of a SMA copolymer and an alcohol as a pigment dispersant. The purpose of such modification is to improve the solubility of the SMA copolymer, giving better dispersing efficiency for the pigments. The inkjet ink composition disclosed by above patents only focuses on modification of the SMA copolymer to improve the dispersion efficiency. However, the above patents have never evaluated the compatibility of modified SMA copolymer-stabilized pigment particles with other binder resins.

Japanese Patent No. 0834953A disclosed a $TiO_2$ pigment-dispersed paste should use a SMA copolymer with a molecular weight of about 500 to 5,000 and a styrene/maleic acid ratio of 0.2 to 4/1 in order to have good compatibility with other binder resins used. However, there was no compatibility study to support this claim.

U.S. Pat. No. 3,528,935 disclosed the thermosetting coating compositions containing a partial ester of a styrene-maleic anhydride copolymer and an epoxide resin having good compatibility. In particular, a low molecular weight of the epoxide resin having epoxide equivalent weight within the range of about 140-750 are in general compatible with the partial esters of styrene maleic anhydride copolymer dissolved in various types of organic solvents including non-polar and polar solvents. However, the use of low molecular weight of epoxide polymers limits the performance of the coating. Furthermore, the coating composition disclosed by the above patent has never mentioned the use of epoxide resins as a compatibilizer for other binder resins.

Therefore, there is a need for overcoming the aforementioned compatibility problems. The present invention discloses a white inkjet ink composition using one or more compatibilizers which can effectively solve the compatibility problems associated with the use of the SMA copolymer as a dispersant for $TiO_2$ pigment dispersion.

SUMMARY OF THE INVENTION

The aforementioned problems are resolved by various aspects and embodiments disclosed herein. In one aspect, provided herein is a white inkjet ink composition comprising:
  a) a white colorant comprising bare titanium dioxide, bare zinc oxide, surface treated titanium dioxide, surface treated zinc oxide or a combination thereof, wherein the white colorant is modified with a functional copolymer to form a modified white colorant, and wherein the functional copolymer comprises an acid group;
b) one or more binder resins;
c) one or more compatibilizers for improving the compatibility of the modified white colorant with the one or more binder resins;
d) an ink solvent; and
e) optionally one or more additives.

In some embodiments, the functional copolymer is a styrene-maleic anhydride copolymer.

In certain embodiments, the average diameter of the white colorant is from about 150 nm to about 500 nm. In other embodiments, the white colorant is surface treated titanium dioxide, surface treated zinc oxide, or a combination thereof. In further embodiments, the average diameter of the white colorant is less than about 400 nm.

In some embodiments, the one or more compatibilizers comprise cellulose acetate propionate, cellulose acetate butyrate, vinyl chloride-vinyl acetate copolymer or a combination thereof. In other embodiments, the one or more compatibilizers are present in an amount from about 0.1% to about 10% by weight, or from about 0.1% to about 5% by weight, based on the total weight of the inkjet ink composition. In further embodiments, the one or more compatibilizers contain hydroxy groups, wherein the hydroxy content is from about 2% to about 10% by weight, based on the total weight of the compatibilizers.

In certain embodiments, the one or more binder resins have at least one functional or polar group to act as a co-stabilizer to disperse the white colorant, and wherein the one or more binder resins are different from the one or more compatibilizers. In other embodiments, the ratio of the one or more compatibilizers to the one or more binder resins is from about 1 to about 20.

In some embodiments, the white colorant is present in an amount from about 0.1% to about 30% by weight, or from about 1% to about 25% by weight, or from about 5% to about 20% by weight, based on the total weight of the inkjet ink composition In certain embodiments, the ink solvent is selected from the group consisting of one or more ketones, one or more alcohols, one or more esters, and combinations thereof. In other embodiments, the ink solvent comprises a mixture of methyl ethyl ketone, ethyl acetate and ethanol. In further embodiments, the ink solvent is present in an amount from about 50% to about 85% by weight, or from about 65% to about 80% by weight, based on the total weight of the inkjet ink composition.

In some embodiments, the one or more binder resins are present in an amount from about 0.1% to about 35% by weight, based on the total weight of the inkjet ink composition.

In certain embodiments, the optionally one or more additives are selected from the group consisting of plasticizers, surfactants, light stabilizers, defoaming agents, antioxidants, UV stabilizers, bactericides, pH control agents, conducting agents, rub resistance agents, and combinations thereof. In other embodiments, the optionally one or more additives comprise one or more plasticizers for solubilizing the binder.

In another aspect, provided herein is a method of making a print on a substrate by jetting the print on the substrate with an inkjet printer using an inkjet ink composition disclosed herein; and drying the print.

In some embodiments, the substrate is a first nonporous substrate and wherein the print on the first nonporous substrate is not substantially transferred to a second nonporous substrate after the first nonporous substrate and the second nonporous substrate with the print between the first and second substrates are bundled by wrapping with a polyethylene wrap and then pressed under a load of 500 g at 50° ° C. for 24 hours. In other embodiments, the amount of the print transferred from the first nonporous substrate to the second nonporous substrate is less than 1% of the print by weight or area.

In certain embodiments, the each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

DETAILED DESCRIPTION OF THE INVENTION

General Definitions

Figure 1:
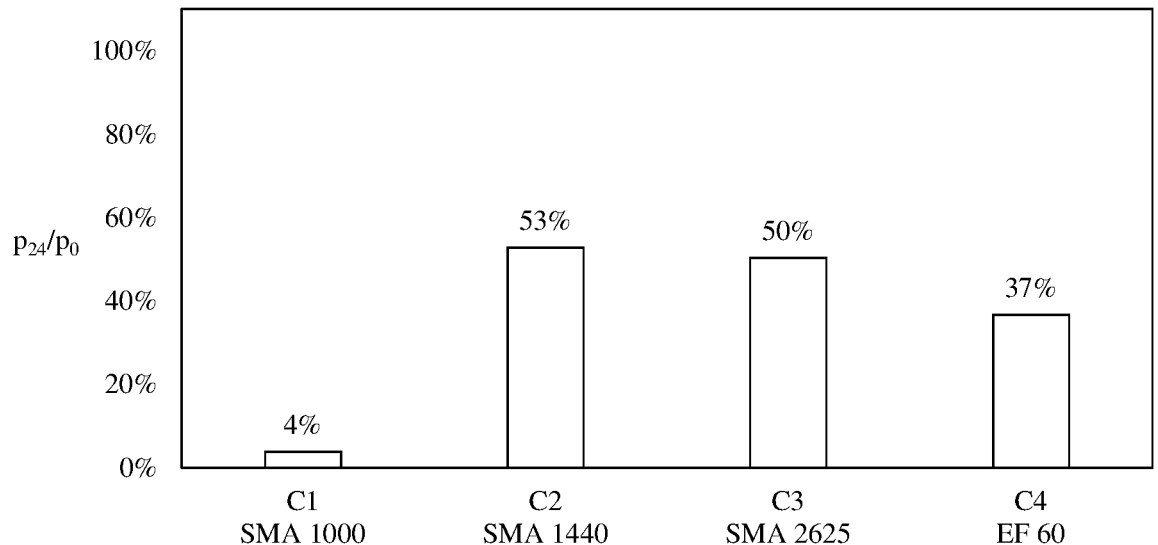
FIG. 1 depicts the dispersion stability of Comparative Examples C1-C4 in MEK.
Figure 2:
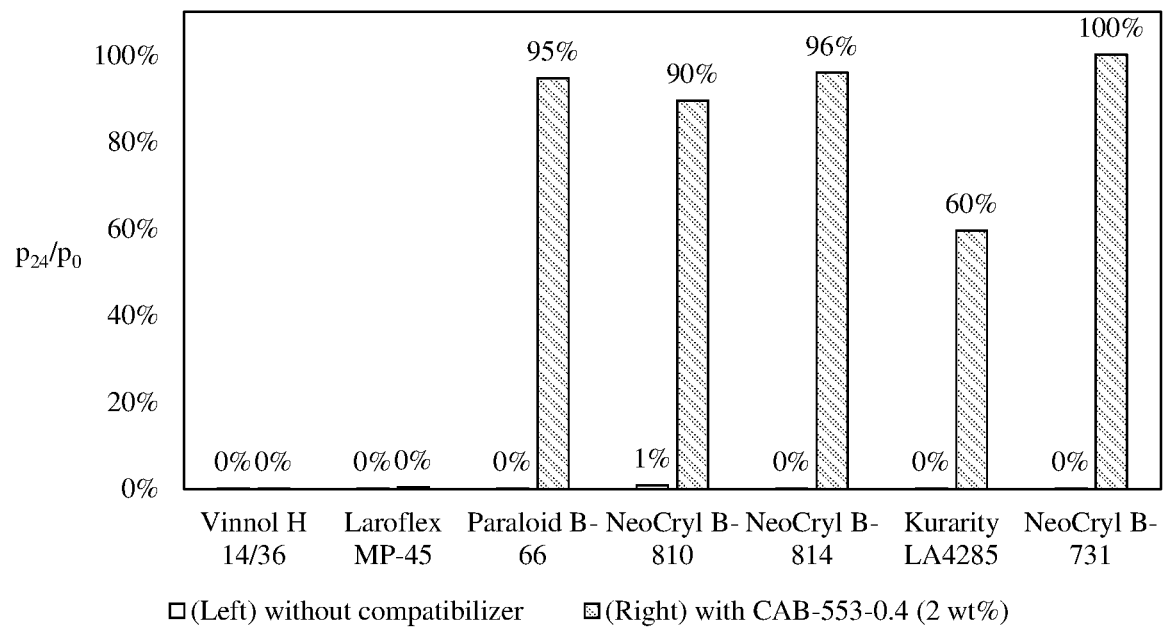
FIG. 2 depicts the effect of CAB-553-0.4 on the dispersion stability of inkjet ink compositions comprising a SMA 1000-pigment concentrates and a binder resin.
Figure 3:
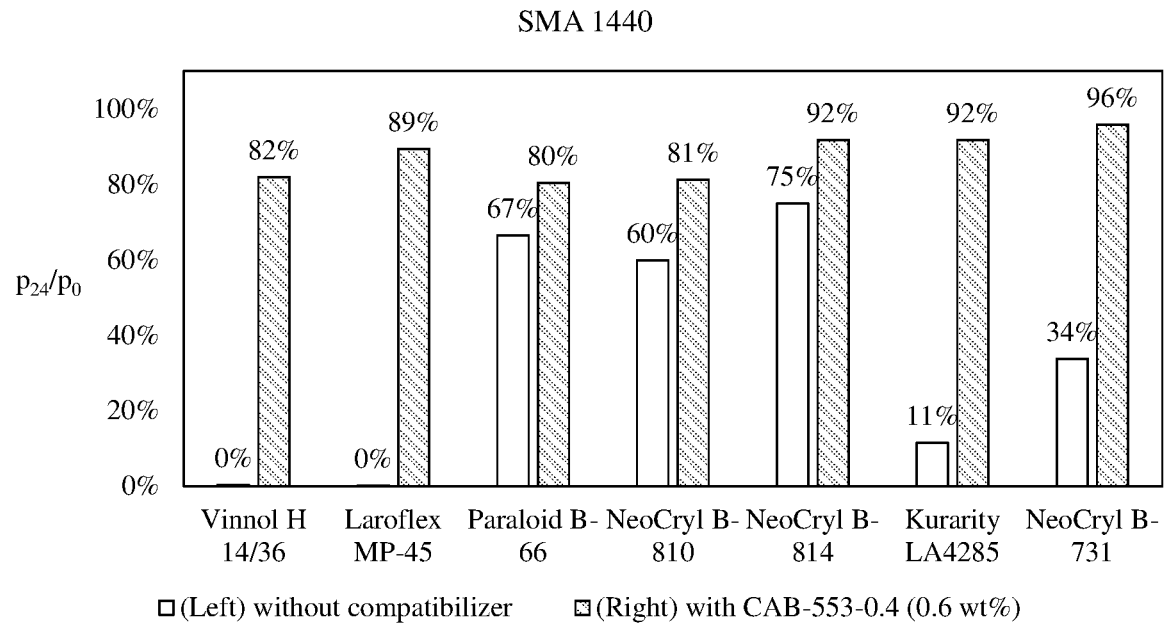
FIG. 3 depicts the effect of CAB-553-0.4 on the dispersion stability of inkjet ink compositions comprising a SMA 1440-pigment concentrates and a binder resin.
Figure 4:
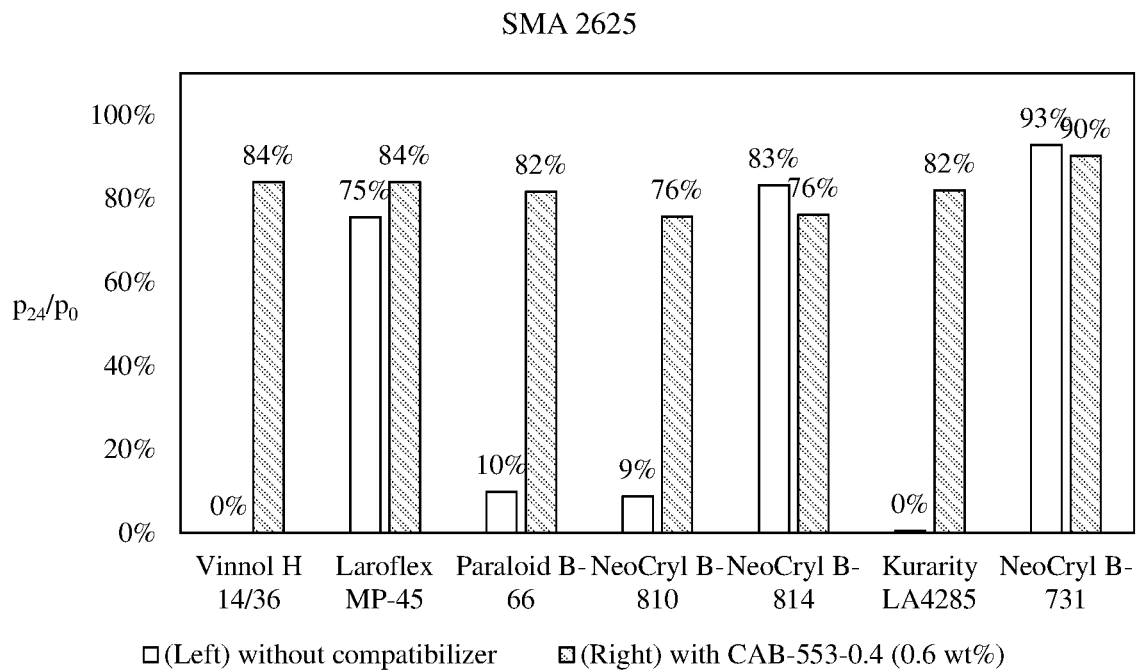
FIG. 4 depicts the effect of CAB-553-0.4 on the dispersion stability of inkjet ink compositions comprising a SMA 2625-pigment concentrates and a binder resin.
Figure 5:
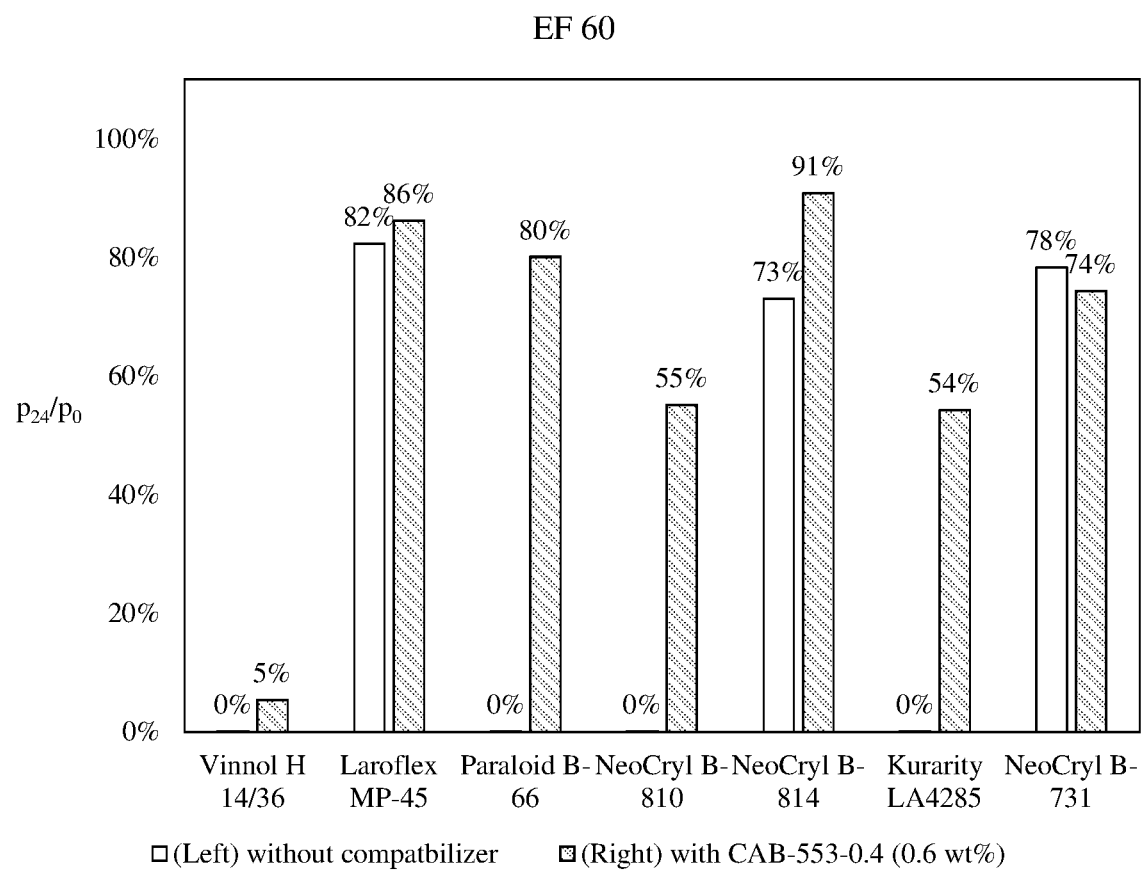
FIG. 5 depicts the effect of CAB-553-0.4 on the dispersion stability of inkjet ink compositions comprising an EF60-pigment concentrate and a binder resin.

The term "compatibilizer" used in an ink composition disclosed herein refers to a component that is able to stabilize the ink composition by preventing phase separation caused by the incompatibility between a SMA copolymer-stabilized white colorant and a binder resin.

The term "white colorant" disclosed herein refers to a white pigment particle having an average particle size ranging from about 50 nm to about 1000 nm in diameter.

Some non-limiting examples of the white pigment particles include particles of bare titanium dioxide, bare zinc oxide, surface treated titanium dioxide, surface treated zinc oxide, or a combination thereof.

The term "Polymer" refers to a polymeric compound prepared by polymerizing one or more monomers or derived from 2 or more molecules of monomers, whether of the same or a different type. The generic term "polymer" embraces the terms "homopolymer," "copolymer," "terpolymer" as well as "interpolymer." In some embodiments, the polymer is derived from more than 1, 2, 3, 4, 5, 10, 15 or 20 molecules of one or more monomers and/or one or more co-monomers.

The term "Interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

The term "Graft copolymer" refers to a copolymer comprising a first polymer X branching from the backbone of a second polymer Y. Each of the first polymer X and the second polymer Y can be independently a homopolymer or an interpolymer. A graft copolymer of X with Y can be represented by the formula X-g-Y. For example, polystyrene-g-polyester represents a graft copolymer of a polystyrene with a polyester.

The term "functional polymer" disclosed herein refers to an organic polymer comprising at least one functional or polar group pendant from the polymer backbone that helps disperse the surface-modified nanoparticles, such as $TiO_2$ and zinc oxide, disclosed herein. In some embodiments, the functional or polar group is quaternary ammonium, hydroxy, an acid group (e.g., salts or acids based on sulfate, salts or acids based on sulfonate, salts or acids based on phosphate, salts or acids based on phosphonate, salts or acids based on carboxyl), a basic group (e.g., amino group) or a combination thereof.

The term "functional copolymer" disclosed herein refers to an organic polymer derived from 2 or more monomers, and the functional copolymer comprises at least one functional or polar group pendant from the polymer backbone that helps disperse the surface-modified nanoparticles, such as $TiO_2$ and zinc oxide, disclosed herein. In some embodiments, the functional or polar group is quaternary ammonium, hydroxy, an acid group, a basic group or a combination thereof.

The term "vinyl monomer" disclosed herein refers to any monomer containing a vinyl group, i.e., —CH=$CH_2$, that can be polymerized into a polymer. In some embodiments, the vinyl monomer is a substituted or unsubstituted olefin such as ethylene or styrene, vinyl halide, vinyl ether, acrylonitrile, acrylic ester, methacrylic ester, acrylamide, methacrylamide or a combination thereof. In other embodiments, the vinyl monomer is ethylene, an α-olefin or a combination thereof. Some non-limiting examples of suitable α-olefins include styrene, propylene, 1-butene, 1-hexene, 1-octene, 4-methyl-1-pentene, norbornene, 1-decene, 1,5-hexadiene and combinations thereof. In certain embodiments, the vinyl monomer is an aryl such as styrene, α-methyl styrene, or di-vinyl benzene. Additional examples include the functionalized vinyl aryls such as those disclosed by U.S. Pat. No. 7,041,761 which is incorporated herein by reference.

The term "polymer substrate" refers to a substrate comprises a plastic or thermoplastic, a thermoset or an elastomer. The term "plastic" or "thermoplastic" refers to a polymer that becomes pliable or moldable above a specific temperature and returns to a solid state upon cooling. Some non-limiting examples of the thermoplastic include polyolefins (such as polyethylene (PE), polypropylene (PP), polymethylpentene (PMP), polybutene-1), crosslinked polyethylene (XLPE), polyamides, polyesters, polycarbonates, polyacrylates, polymethacrylates, polystyrene, polybenzimidazole, and halogenated plastics (such as poly(vinylidene chloride), poly(vinyl chloride), and polytetrafluoroethylene). Any pliable thermoset or elastomer can also be used herein. In some embodiments, the polymer is selected from the group consisting of thermoplastics, thermosets, elastomers and combinations thereof. In some embodiments, the polymer comprises one or more thermoplastics.

The term "nonporous polymer substrate" refers to a polymer substrate that has a porosity or void fraction less than 0.3, less than 0.25, less than 0.2, less than 0.15, less than 0.1, less than 0.05, less than 0.04, less than 0.03, less than 0.02, or less than 0.01. The porosity or void fraction of a material refers to a fraction of the volume of voids over the total volume of the material.

A composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total weight of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is a white inkjet ink composition containing one or more compatibilizers, one or more binder resins and a SMA copolymer-stabilized white colorant, wherein the one or more compatibilizers can effectively improve the compatibility of the SMA copolymer-stabilized white colorant with the one or more binder resins to slow down the sedimentation rate and resist nozzle clogging upon jetting.

In one aspect, provided herein is an inkjet ink composition comprising:
  a) a white colorant comprising bare titanium dioxide, bare zinc oxide, surface treated titanium dioxide, surface treated zinc oxide or a combination thereof, wherein the white colorant is modified with a functional copolymer to form a modified white colorant, and wherein the functional copolymer comprises an acid group;
  b) one or more binder resins;
  c) one or more compatibilizers for improving the compatibility of the modified white colorant with the one or more binder resins;
  d) an ink solvent; and
  e) optionally one or more additives.

In another aspect, provided herein is an inkjet ink composition comprising:
  a) a white colorant comprising bare titanium dioxide, bare zinc oxide, surface treated titanium dioxide, surface treated zinc oxide or a combination thereof, wherein the white colorant is modified with a styrene-maleic anhydride copolymer to form a modified white colorant;
  b) one or more binder resins;
  c) one or more compatibilizers for improving the compatibility of the modified white colorant with the one or more binder resins;
  d) an ink solvent; and
  e) optionally one or more additives.

Any functional copolymer comprises an acid group or a basic group can be used herein for modifying the white colorant. In some embodiments, the functional copolymer comprises an acid group, a hydroxy group, or an amino group. In other embodiments, the functional copolymer is free of an acid group, a hydroxy group, or an amino group. In certain embodiments, the functional copolymer comprises an acid group.

In certain embodiments, the functional copolymer is derived from copolymerizing a vinyl monomer, such as styrene, with an acid modifier having formula (I), (II), (III), or (IV):

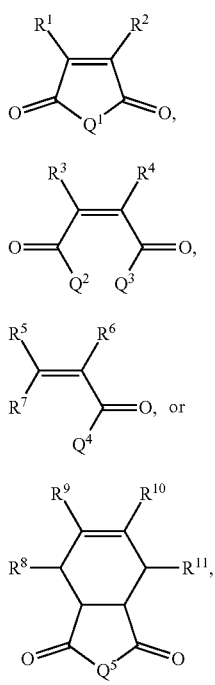

wherein each of $Q^1$ and $Q^5$ is independently O; each of $Q^2$, $Q^3$, and $Q^4$ is independently halo or OH; and each of $R^1$ to $R^{11}$ is independently H, $C_{1-20}$ alkyl, $C_{1-20}$ alkenyl, $C_{1-20}$ alkynyl, cycloalkyl, aryl, aralkyl, alkaryl, OH, $NH_2$, carboxyl, epoxy or glycidyl, or $R^8$ and $R^{11}$ together form a $-(CH_2)_m-$ group where m is an integer from 1 to about 6, and wherein each of the $C_{1-20}$ alkyl, $C_{1-20}$ alkenyl, $C_{1-20}$ alkynyl, cycloalkyl, aryl, aralkyl, alkaryl, epoxy, glycidyl and $-(CH_2)_m-$ is optionally substituted.

In certain embodiments, the functional copolymer is prepared by copolymerizing the vinyl monomer and the acid modifier in the presence of a free radical initiator, such as 2,2'-azobisisobutyronitrile, in a polar solvent, such as N,N-dimethylformamide, at an elevated temperature. In some embodiments, the reaction temperature is from about 25° C. to about 300° C., from about 25° C. to about 250° C., from about 25° C. to about 200° °C., from about 25° C. to about 150° C., from about 50° C. to about 300° C., from about 50° °C. to about 250° C., from about 50° C. to about 200° C., from about 50° C. to about 150° C., from about 50° C. to about 140° C., from about 50° C. to about 130° C., from about 50° C. to about 120° C., or from about 50° C. to about 110° C.

Any conventional free radical initiator can be used herein. In certain embodiments, the grafting initiator is a dialkyl peroxide, a diacyl peroxide, a peroxyester, a peroxyketone, azobisisobutyronitrile or a combination thereof. In other embodiments, the grafting initiator is benzoyl peroxide, dicumyl peroxide, dilauryl peroxide, tert-butyl peroxyacetate, azobisisobutyronitrile or a combination thereof.

Alternatively, the functional copolymer can be prepared by first polymerizing vinyl monomer disclosed herein, such as styrene, to form a homopolymer, such as polystyrene; and then grafting at least one of the acid modifiers disclosed herein to the homopolymer in the presence of a grafting initiator or radiation or a combination thereof. Any radiation suitable for cross-linking homopolymers derived from vinyl monomers can be used herein. Any free radical initiator disclosed herein can be used as the grafting initiator.

In certain embodiments, the acid modifier has formula (I). Some non-limiting examples of the acid modifier having formula (I) include maleic anhydride, citraconic anhydride, itaconic anhydride and combinations thereof.

In some embodiments, the acid modifier has formula (II). Some non-limiting examples of the acid modifier having formula (II) include mesaconic acid, maleic acid, fumaric acid, maleyl chloride, and combinations thereof.

In certain embodiments, the acid modifier has formula (III). Some non-limiting examples of the acid modifier having formula (III) include methacrylic acid, acrylic acid, itaconic acid and combinations thereof.

In some embodiments, the acid modifier has formula (IV). Some non-limiting examples of the acid modifier having formula (IV) include bicyclo[2.2.2]-oct-5-ene-2,3-dicarboxylic acid anhydride, bicyclo[2.2.1]hept-5-ene-2,3-dicarboxylic acid anhydride and combinations thereof.

In certain embodiments, the functional copolymer is prepared by copolymerizing the vinyl monomer and the acid modifier in the presence of a free radical initiator, such as 2,2'-azobisisobutyronitrile, in a polar solvent, such as N,N-dimethylformamide, at an elevated temperature. In some embodiments, the reaction temperature is from about 25° C. to about 300° C., from about 25° C. to about 250° C., from about 25° C. to about 200° C., from about 25° C. to about 150° C., from about 50° C. to about 300° C., from about 50° C. to about 250° C., from about 50° C. to about 200° C., from about 50° C. to about 150° C., from about 50° C. to about 140° C., from about 50° C. to about 130° C., from about 50° C. to about 120° C., or from about 50° C. to about 110° ° C.

The amount of the acid modifier present in the functional copolymer may vary, depending on the ratio of the vinyl monomer to the acid modifier. In some embodiments, the ratio of the vinyl monomer to the acid modifier is from about 100,000:1 to about 100:10, from about 100,000:1 to about 100:5, from about 100,000:1 to about 100:4, from about 100,000:1 to about 100:3, from about 100,000:1 to about 100:2, from about 100,000:1 to about 100:1, from about 100,000:1 to about 100:0.5, from about 100,000:1 to about 100:0.25, from about 100,000:1 to about 100:0.2, or from about 100,000:1 to about 100:0.1 by weight.

In certain embodiments, the acid group in the functional copolymer is in an amount of at least about 0.1 wt. %, at least about 0.2 wt. %, at least about 0.3 wt. %, at least about 0.4 wt. %, or at least about 0.5 wt. %, based on the total weight of the functional copolymer. In other embodiments, the acid group is present in an amount of at most about 10 wt. %, at most about 5 wt. %, at most about 4 wt. %, at most about 3 wt. %, at most about 2 wt. %, at most about 1 wt. %, at most about 0.5 wt. %, at most about 0.25 wt. %, or at most about 0.1 wt. %, based on the total weight of the functional copolymer.

Any compatibilizer that can stabilize the ink composition by preventing phase separation caused by the incompatibility between the functional copolymer-stabilized white colorant disclosed herein (such as the SMA copolymer-stabilized white colorant) and a binder resin can be used herein. In some embodiments, the compatibilizer disclosed herein is a block or graft copolymers made of two portions, wherein one portion is compatible or able to interact with the SMA copolymer-stabilized white colorant or the SMA copolymer itself; and the other portion is compatible or able to interact with the binder resin.

Some non-limiting examples of suitable compatibilizer include cellulose acetate propionate (e.g., sold under tradenames CAP-482-0.5 and CAP-504-0.2 by Eastman Chemical Company, Kingsport, TN; sold by Merck), cellulose acetate butyrate (e.g., sold under tradename CAB-553-0.4 by Eastman Chemical Company, Kingsport, TN; sold by Merck) and vinyl chloride-vinyl acetate copolymer (e.g., sold under tradename Solbin A by Shin-Etsu, Phoenix, AZ; sold under tradename Vinnol®Resins by Wacker Chemie; sold under Kanevinyl™ M series by Kaneka; sold by Merck; sold under UCAR™ by Dow). In some embodiments, the compatibilizer is free of cellulose acetate propionate, cellulose acetate butyrate, or vinyl chloride-vinyl acetate copolymer.

In some embodiments, the one or more compatibilizers are polymers comprising a hydroxy group, and acid group, or an amino group. In other embodiments, the one or more compatibilizers are polymers free of a hydroxy group, and acid group, or an amino group. In certain embodiments, the one or more compatibilizers are polymers comprising a hydroxy group, wherein the hydroxy content is from about 2% to about 10%, based on the total weight of the compatibilizers. In other embodiment, the hydroxy value is from about 2.5% to about 8%, from about 3% to about 6%, from about 3.5% to about 5%, or from about 4% to about 4.5%, based on the total weight of the compatibilizers.

In certain embodiments, the one or more compatibilizers are present in an amount from about 0.1% to about 10% by weight, based on the total weight of the inkjet ink composition. In other embodiment, the compatibilizer is present in an amount from about 0.5% to about 8%, from about 1% to about 6%, from about 2% to about 5%, or from about 3% to about 4% by weight.

In certain embodiments, a weight ratio of the one or more compatibilizers to one or more binder resins is from about 1:1 to about 1:20, from about 1:1 to about 1:15, from about 1:1 to about 1:10, from about 1:1 to about 1:8, from about 1:1 to about 1:6, from about 1:1 to about 1:4, from about 1:1 to about 1:2, or from about 1:1 to about 1:1.

In some embodiments, the white colorant comprises bare titanium dioxide, a surface treated titanium dioxide, bare zinc oxide, a surface treated zinc oxide or a combination thereof. In further embodiments, the white colorant comprises a surface treated titanium dioxide. In still further embodiments, the white colorant comprises surface treated titanium dioxide, surface treated zinc oxide or a combination thereof.

In some embodiments, the average particle size or diameter of the white colorant or modified white colorant is from about 30 nm to about 1000 nm, from about 50 nm to about 500 nm, from about 50 nm to about 450 nm, from about 100 nm to about 450 nm, from about 150 nm to about 450 nm, from about 50 nm to about 400 nm, from about 100 nm to about 400 nm, from about 150 nm to about 400 nm, from about 200 nm to about 400 nm, from about 50 nm to about 350 nm, from about 100 nm to about 350 nm, from about 150 nm to about 350 nm, from about 200 nm to about 350 nm, or from about 250 nm to about 350 nm.

In certain embodiments, the average particle size or diameter of the white colorant or modified white colorant is less than about 1000 nm, less than about 800 nm, less than about 600 nm, less than about 500 nm, less than about 450 nm, less than about 400 nm, less than about 350 nm, less than about 300 nm, less than about 250 nm, less than about 200 nm, less than about 150 nm, or less than about 100 nm. In other embodiments, the average particle size or diameter of white colorant or modified white colorant is more than about 30 nm, more than about 50 nm, more than about 75 nm, more than about 100 nm, more than about 125 nm, more than about 150 nm, more than about 175 nm, more than about 200 nm or more than about 250 nm.

In some embodiments, the SMA copolymers functions as a dispersant that helps disperse the white colorant disclosed here in a solvent. Some non-limiting examples of SMA copolymers include SMA 1000, SMA 1440, SMA 1440P, SMA 17352, SMA 2000, SMA 2625, SMA 2625P, SMA 3000, SMA 4000, EF-10, EF-20, EF-30, EF-40, EF-60, EF-80 which are commercially available from Cray Valley (Exton, Pennsylvania). Other non-limiting examples of SMA copolymers include XIRAN® 1000, XIRAN® 2000, XIRAN® 2500, XIRAN® 3000, XIRAN® 3600, XIRAN® 4000, XIRAN® 6000, XIRAN® 9000, XIRAN® EF 10, XIRAN® EF 20, XIRAN® EF 30, XIRAN® EF 40, XIRAN® EF 60, XIRAN® EF 80, XIRAN® 10001, XIRAN® EF 30001, XIRAN® 1440, XIRAN® 17352, XIRAN® 2625, XIRAN® 3840, which are commercially available from Polyscope (Exton, Pennsylvania).

In certain embodiments, the white colorant is present in an amount from about 1% to about 30% by weight, based on the total weight of the inkjet ink composition. In some embodiments, the white colorant is present in an amount from about 1 wt. % to about 30 wt. %, about 2 wt. % to about 30 wt. %, about 3 wt. % to about 30 wt. %, about 1 wt. % to about 25 wt. %, about 1 wt. % to about 20 wt. %, about 1 wt. % to about 15 wt. %, or about 1 wt. % to about 10 wt. %, based on the total weight of the inkjet ink composition. In other embodiments, the white colorant is present in an amount less than 30 wt. %, less than 25 wt. %, less than 20 wt. %, less than 15 wt. %, or less than 10 wt. %, based on the total weight of the inkjet ink composition. In further embodiments, the white colorant is present in an amount more than 1 wt. %, more than 5 wt. %, more than 10 wt. %, more than 15 wt. %, or more than 20 wt. %, based on the total weight of the inkjet ink composition.

Any organic solvent or a solvent mixture that can dissolve the binder disclosed herein can be used as the ink solvent. The solvent is also a major component which acts as a vehicle for the colorant and provides ink with rapid drying properties. In some embodiments, the ink solvent disclosed herein comprises one or more solvents. The term "major component" refers to the component that is more than 50%, more than 55%, more than 60%, more than 65%, more than 70%, more than 75%, more than 80%, more than 85%, more than 90%, or more than 95% by weight or volume, based on the total weight or volume of the ink solvent.

Some non-limiting examples of the organic solvent include lower alkanols containing 1 to 4 carbon atoms, such as methanol, ethanol, propanol, 2-propanol, butanol etc.; lower aliphatic ketones, such as acetone, dimethyl ketone, methyl ethyl ketone, methyl n-propyl ketone, methyl isobutylketone, cyclopropyl methyl ketone, etc.; other solvents such as ethyl acetate, isopropyl acetate, propyl acetate, butyl acetate; and combinations thereof. In certain embodiments, the solvent component is methyl ethyl ketone, ethyl acetate, ethanol or a combination thereof.

Other non-limiting examples of the solvent include ketone solvents, acetate solvents, the propionate esters, and carbonate solvents. Some non-limiting examples of the ketone solvents include methyl isoamy ketone, methyl m-amyl ketone, diisobutylketone, diacetone alcohol, C-11 ketone, acetophenone, cyclohexanone and the like. Some non-limiting examples of the acetate solvents include dimethyl acetate, butyl acetate, isobutyl isobutyrate, n-butyl propionate, 2-ethylhexyl acetate, and the like. Some non-limiting examples of the glycol ethers such as propylene glycol monomethyl ether, ethylene glycol monomethyl ether, propylene glycol monotertiary buty ether, ethylene glycol monopropyl ether, propylene glycol monopropyl ether, propylene glycol monobutyl ether, ethylene glycol monobutyl ether, diethylene glycol monomethyl ether, dipropylene glycol monomethyl ether, diethylene glycol monoethyl ether, diethylene glycol monopropyl ether, diethylene glycol monobutyl ether, and the like. Some non-limiting examples of the glycol ether acetate such as ethylene glycol monoethyl ether acetate, ethylene glycol monobutyl ether acetate, ethylene glycol diacetate, diethylene glycol monoethyl ether acetate, diethylene glycol monobutyl ether acetate, propylene glycol monomethyl ether acetate, and the like. Some non-limiting examples of the carbonate solvents comprise dimethyl carbonate, diethyl carbonate, ethylene carbonate, propylene carbonate, and the like. Some non-limiting examples of other solvent include N-methyl pyrrolidone, N-ethyl pyrrolidone, quinoline, pyridine, dimethyl formamide, m-cresol, 2-chlorophenol, and the like. The composition of the ink solvent further allows tuning the drying rate of the ink and adjusting the solution viscosity to any desired range, such as 2 to 10 mPa·s, for inkjet printers.

In certain embodiments, the ink solvent is selected from the group consisting of ketones, alcohols, esters, and combinations thereof. In certain embodiments, the ink solvent comprises a mixture of methyl ethyl ketone, ethyl acetate and acetone. In certain embodiments, the ink solvent is substantially free of water. In other embodiments, the ink solvent contains less than 0.1 wt. %, less than 0.5 wt. %, less than 1 wt. %, less than 2 wt. %, less than 3 wt. %, or less than 5 wt. % of water, based on the total weight of the ink solvent.

In some embodiments, the ink solvent is present in an amount from about 50% to about 85% by weight, or from about 65% to about 80% by weight, based on the total weight of the inkjet ink composition. In other embodiments, the ink solvent is present in an amount less than 90 wt. %, less than 85 wt. %, less than 80 wt. %, less than 75 wt. %, or less than 70 wt. %, based on the total weight of the inkjet ink composition. In further embodiments, the ink solvent is present in an amount more than 40 wt. %, more than 45 wt. %, more than 50 wt. %, more than 60 wt. %, or more than 65 wt. %, based on the total weight of the inkjet ink composition.

The one or more binder resins confer the ink coating with desirable mechanical and chemical properties. For example, fast drying, adhesion, glossiness, water resistant, petrol resistant, transfer resistant, abrasion resistance, UV resistant, and the like. In some embodiments, the one or more binder resins have at least one functional or polar group pendant from the polymer backbone that act as a co-stabilizer to disperse the white colorant disclosed herein in a solvent. Some non-limiting examples of the functional or polar groups include quaternary ammonium, amino, hydroxyl, heterocyclic moieties, sulfuric acid and sulfate groups, sulfonic acid and sulfonate salts groups, phosphoric acid and phosphate groups, phosphonic and phosphonate groups, carboxylic acid and carboxylate groups, mixtures thereof, and the like. In certain embodiments, the polymer backbone of the one or more binder resins disclosed herein comprises a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), an acrylic polymer (e.g., methyl methacrylate-co-butyl methacrylate copolymers and polymethyl methacrylate), or a combination thereof.

The one or more binder resins disclosed herein can be used to promote ink adhesion on substrates. Some non-limiting examples of the one or more binder resins include aldehyde-ketone resins, epoxy resins, rosin esters, phenolic modified rosin resin, fumaric modified rosin resin, maleic modified rosin resin, hydrogenated rosin resin, dimerized rosin resin, silicon resins, alkyl benzene-sulfonamide resins, vinyl resins, cellulose derivatives, styrene-acrylic resins, styrene-maleic anhydride copolymers, acrylic resins, polyurethanes, polyurethane derivatives, polyester resins, polyamides, polysiloxane resins, poly(vinyl butyral) resins, aldehyde resins, phenolic resins, etc. In certain embodiments, a combination of two or more binders is used in order to provide better balance between the adhesion ability and ink viscosity.

In certain embodiments, the one or more binder resins disclosed herein may be a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), acrylic polymers (e.g., methyl methacrylate-co-butyl methacrylate copolymers, methyl methacrylate homopolymer, etc) or a combination thereof. In some embodiments, the one or more binder resins may be a self-wetting binder comprising one or more polar group for interacting with the surface of the surface-modified nanoparticles. Some non-limiting examples of suitable polar groups include quaternary ammonium, amino, hydroxyl, heterocyclic moieties, sulfuric acid and sulfate groups, sulfonic acid and sulfonate salts groups, phosphoric acid and phosphate groups, phosphonic and phosphonate groups, carboxylic acid and carboxylate groups, mixtures thereof, and the like. Some self-wetting binders are disclosed in U.S. Pat. Nos. 6,139,946 and 6,139,966, both of which are incorporated herein by reference.

In some embodiments, the amount of the one or more binder resins is from 0.1% to 50%, from 0.1% to 40%, from 0.1% to 35%, from 0.5% to 30%, or from 1% to 25% by weight. In certain embodiments, the one or more binder resins is present in an amount from about 0.1% to about 35% by weight, based on the total weight of the inkjet ink composition. In other embodiments, the one or more binder resins is present in an amount less than 35 wt. %, less than 30 wt. %, less than 25 wt. %, less than 20 wt. %, or less than 15 wt. %, based on the total weight of the inkjet ink composition. In further embodiments, the one or more binder resins is present in an amount more than 0.1 wt. %, more than 1 wt. %, more than 3 wt. %, more than 5 wt. %, or more than 10 wt. %, based on the total weight of the inkjet ink composition.

Optionally, the inkjet ink composition disclosed herein comprises one or more additives for the purposes of improving and/or controlling the processability, appearance, physical, chemical, and/or mechanical properties of the inkjet ink composition. In some embodiments, the inkjet ink composition does not comprise any additive. Any inkjet ink additive known to a person of ordinary skill in the art may be used in the inkjet ink composition disclosed herein.

In some embodiments, the one or more additives may be selected from the group consisting of plasticizers, surfactants or surface modifiers, light stabilizers, defoaming agents, antioxidants, UV stabilizers, bactericides, pH control agents, conducting agents, rub resistant agents, and combinations thereof. In other embodiments, the one or more additives may comprise one or more plasticizers for solubilizing the binder. In further embodiments, the inkjet ink composition disclosed herein is substantially free of one or more of plasticizers, surfactants or surface modifiers, light stabilizers, defoaming agents, antioxidants, UV stabilizers, bactericides, pH control agents, conducting agents, and rub resistance agents.

In some embodiments, the total amount of the one or more additives is from 0.1% to 10%, from 0.1% to 8%, from 0.1% to 6%, from 0.1% to 5%, from 0.1% to 4%, from 0.1% to 3%, from 0.1% to 2%, or from 0.1% to 1% by weight, based on the total weight of the inkjet ink composition. In certain embodiments, the total amount of the one or more additives is from about 1 wt. % to about 10 wt. %, about 2 wt. % to about 10 wt. %, about 3 wt. % to about 10 wt. %, about 0.1 wt. % to about 8 wt. %, about 0.1 wt. % to about 6 wt. %, about 0.1 wt. % to about 5 wt. %, or about 0.1 wt. % to about 4 wt. %, based on the total weight of the inkjet ink composition. In other embodiments, the total amount of the one or more additives is less than 10 wt. %, less than 8 wt. %, less than 6 wt. %, less than 5 wt. %, or less than 4 wt. %, based on the total weight of the inkjet ink composition. In further embodiments, the total amount of the one or more additives is more than 0.1 wt. %, more than 0.5 wt. %, more than 1 wt. %, more than 2 wt. %, or more than 3 wt. %, based on the total weight of the inkjet ink composition.

The inkjet ink composition disclosed herein can comprise a plasticizer. Any plasticizer known to a person of ordinary skill in the art may be added to the inkjet ink composition disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polyester phthalate, polyester adipate, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioesters, aromatic sulfonamides and combinations thereof. Where used, the amount of the plasticizer in the inkjet ink composition can be from than 0 to about 10 wt. %, from about 0.5 wt. % to about 10 wt. %, or from about 1 wt. % to about 5 wt. % of the total weight of the inkjet ink composition. Some plasticizers have been described in George Wypych, "Handbook of Plasticizers," ChemTec Publishing, Toronto-Scarborough, Ontario (2004), which is incorporated herein by reference. In further embodiments, the inkjet ink composition disclosed herein is substantially free of plasticizer.

In some embodiments, the plasticizers include diethyl phthalate, di-n-butyl phthalate, diisobutyl phthalate, di-n-hexyl phthalate, bis(2-ethylhexyl) phthalate, diisodecyl phthalate, diisononyl phthalate, 1,2-cyclohexane dicarboxylic acid diisonoyl ester, tri-(2-ethyl hexyl)trimellitate, tri-(n-octyl, n-decyl)trimellitate, tri-(heptyl, nonyl)trimellitate, n-octyl trimellitate, bis(2-ethylhexyl)adipate, etc. In other embodiments, the total amount of the binders and the plasticizers is from 0.1% to 50%, from 0.1% to 40%, from 0.1% to 35%, from 0.5% to 30%, from 1% to 25%, from 2% to 20%, or from 3% to 15% by weight, based on the total weight of the inkjet ink composition.

The inkjet ink composition disclosed herein optionally comprises an antioxidant that can prevent the oxidation of polymer components and organic additives in the inkjet ink composition. Any antioxidant known to a person of ordinary skill in the art may be added to the inkjet ink composition disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the inkjet ink composition can be from about greater than 0 to about 5 wt. %, from about 0.0001 to about 2.5 wt. %, from about 0.001 wt. % to about 1 wt. %, or from about 0.001 wt. % to about 0.5 wt. % of the total weight of the graft copolymer composition. Some antioxidants have been described in Zweifel Hans et al., "Plastics Additives Handbook," Hanser Gardner Publications, Cincinnati, Ohio, 5th edition, Chapter 1, pages 1-140 (2001), which is incorporated herein by reference. In further embodiments, the inkjet ink composition disclosed herein is substantially free of antioxidant.

The inkjet ink composition disclosed herein optionally comprises a surfactant. The surface modifiers or surfactants can be used to regulate the surface tension of inkjet ink composition disclosed herein and/or disperse the surfaced-modified nanoparticles in the ink solvent disclosed herein. Some non-limiting examples of suitable surfactants include anionic surfactants, cationic surfactants, non-ionic surfactants, zwitterionic surfactants, and combinations thereof. In some embodiments, one or more anionic surfactants, one or more non-ionic surfactants or a combination thereof are used. In further embodiments, the inkjet ink composition disclosed herein is substantially free of one or more of anionic surfactants, cationic surfactants, non-ionic surfactants, and zwitterionic surfactants.

Some non-limiting examples of the suitable surfactants include fluorosurfactants, siloxane-based surfactants, acetylenic diol-based surfactants, hydrocarbon-based surfactants, and combinations thereof. In some embodiments, two or more surfactants are used together in order to optimize the jetting stability.

In some embodiments, the surfactant is a phosphorylated polyoxyalkyl polyol ("POCA"). The POCA surfactant is fully described in U.S. Pat. No. 4,889,895. In some embodiments, the surfactant is one of the Emcol surfactants such as Emcol Chloride, Emcol Phosphate, and Emcol Acetate available from Witco Chemical, Oakland, New Jersey. The Emcol surfactants are polypropoxylated quaternary ammonium based cationic surfactants.

In some embodiments, the anionic surfactant is or comprises an alkyl sulfate, an alkyl sulfonate, an alkylaryl sulfate, an alkylaryl sulfonate (e.g., alkyl-naphthalene sulfonates and alkylbenzene sulfonates) or a combination thereof.

In certain embodiments, the non-ionic surfactant is or comprises an alkyl polyoxyalkylene, an aryl polyoxyalkylene, a polyoxyalkylene block copolymer, a polyethylene oxide, a polypropylene oxide, a block copolymer of ethylene oxide and propylene oxide or a combination thereof. In other embodiments, the non-ionic surfactant is or comprises a polyether polyol, a polyoxyethylene $C_{8-20}$-alkyl ether, a polyoxyethylene $C_{8-20}$-alkylaryl ether (e.g., polyoxyethylene $C_{8-20}$-alkylphenyl ether), a polyoxyethylene $C_{8-20}$-alkyl amine, a polyoxyethylene $C_{8-20}$-alkenyl ether, a polyoxyethylene $C_{8-20}$-alkenyl amine, a polyethylene glycol alkyl ether or a combination thereof. Some non-limiting examples of suitable polyoxyethylene $C_{8-20}$-alkyl ethers include polyoxyethylene lauryl ether, polyoxyethylene cetyl ether, polyoxyethylene stearyl ether, polyoxyethylene branched decyl ether, polyoxyethylene tridecyl ether or a combination thereof. Some non-limiting examples of suitable polyoxyethylene $C_{8-20}$-alkylaryl ethers include polyoxyethylene dodecylphenyl ether, polyoxyethylene nonylphenyl ether, polyoxyethylene octylphenyl ether or a combination thereof. One non-limiting example of suitable polyoxyethylene $C_{8-20}$-alkenyl ether is polyoxyethylene oleic ether. Some non-limiting examples of suitable polyoxyethylene $C_{8-20}$-alkyl amines include polyoxyethylene lauryl amine, polyoxyethylene stearyl amine, polyoxyethylene tallow amine or a combination thereof. One non-limiting example of suitable polyoxyethylene $C_{8-20}$-alkenyl amine is polyoxyethylene oleyl amine. In other embodiments, the non-ionic surfactant is a polyether polyol, polyoxyethylene nonylphenyl ether, polyoxyethylene dodecylphenyl ether or a combination thereof. In certain embodiments, the non-ionic surfactant contains a polyoxyethylene hydrophilic tail.

The inkjet ink composition disclosed herein optionally comprises a pH control agent. The pH control agent can be used to adjust or maintain the pH (acidity or alkalinity) of the inkjet ink composition. Any organic acid capable of donating a proton can be used to tune the pH of the inkjet ink composition below 7. Some non-limiting examples of suitable organic acid include carboxylic acids, sulfonic acids, phosphonic acids, their derivatives and combinations thereof. Some non-limiting examples of carboxylic acid include acetic acid, formic acid, tartaric acid, lactic acid, oxalic acid, citric acid, uric acid, malic acid and combinations thereof. Any organic base can be used to tune the pH of the inkjet ink composition above 7. Some non-limiting examples of suitable organic base include alkylamines, pyridine, imidazole, benzimidazole, histidine, phosphazene, hydroxides of quaternary ammonium cations, organic cations, and combinations thereof. Some non-limiting examples of suitable alkylamine include triethylamine, bis(2-ethylhexyl)amine, tris(2-ethylhexyl)amine and combinations thereof.

The inkjet ink composition disclosed herein optionally comprises a conducting agent or an antistatic agent. The conducting agent or antistatic agent can be used to increase the conductivity of the inkjet ink composition and to prevent static charge accumulation. Non-limiting examples of suitable conducting agents or antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), which is incorporated herein by reference. In further embodiments, the inkjet ink composition disclosed herein is substantially free of conducting or antistatic agent.

In some embodiments, the conducting agent is selected from the salts of alkali metals, alkaline earth metals and quaternary ammonium. The counter ions of the salts can be selected from halides (chlorides, bromides, iodides, fluorides), perchlorates, nitrates, thiocyanates, formates, acetates, sulfates, propionates, hexafluorophosphates, hexafluoroantimonates and combinations thereof. Some non-limiting examples of the conducting salt can also be ionic liquids such as 1-butyl-3-methylimidazolium tetrafluoroborate, and 1-butyl-3-methylimidazolium hexafluorophosphate.

In certain embodiments, the inkjet ink composition does not flocculate during inkjet printing. In other embodiments, the inkjet ink composition does not flocculate after stored for more than 1 week, more than 1 month, more than 6 months, or more than 1 year at room temperature or an elevated temperature (e.g., about 35° C., about 40° C., about 50° C., about 60° C., or about 5° C. or about 10° C. below the boiling point of the ink solvent).

In some embodiments, a print formed on a first nonporous substrate by an inkjet printer using the inkjet ink composition disclosed herein is not substantially transferred to a second nonporous substrate after the first nonporous substrate and the second nonporous substrate with the print between the first and second substrates are bundled by wrapping with a polyethylene wrap and then pressed under a load of 500 g, 1 kg, 2 kg, about 5 kg, or about kg at about 40° C., about 50° C., or about 60° C. for about 12 hours, about 24 hours, or about 48 hours. In other embodiments, the amount of the print transferred from the first nonporous substrate to the second nonporous substrate is less than 0.1%, less than 0.5%, less than 1%, less than 2.5%, or less than 5% of the print by weight or area after the first nonporous substrate and the second nonporous substrate with the print between the first and second substrates are bundled by wrapping with a polyethylene wrap and then pressed under a load of 500 g, 1 kg, 2 kg, about 5 kg, or about 10 kg at about 40° C., about 50° C., or about 60 °C for about 12 hours, about 24 hours, or about 48 hours.

In certain embodiments, each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

The inkjet ink formulation disclosed herein can be applied to a nonporous plastic surface using a continuous inkjet printer, such as Leibinger Jet 2 & Jet 3 series. The inkjet ink composition can be used for printing a black marking on a surface of a nonporous plastic, for example, poly(vinyl chloride) (PVC), high density polyethylene (HDPE), corona treated HDPE, and crosslinked PE (XLPE). The resulting marking on the surface of the nonporous plastic possesses high hiding power, good contrast, good transfer resistance, good light fastness, as compared to carbon black-based inkjet ink composition.

In some embodiments, the inkjet ink composition comprises:
  a) a white colorant comprising bare titanium dioxide, bare zinc oxide, surface treated titanium dioxide, surface treated zinc oxide or a combination thereof, wherein the white colorant is modified with styrene-maleic anhydride copolymer to form a modified white colorant, and wherein the white colorant is in an amount from about 0.01% to about 30%, from about 0.05% to about 20%, from about 0.1% to about 10%, or from about 0.05% to about 5% by weight;
b) one or more binder resins in an amount from about 0.1% to about 50%, from about 0.1% to about 40%, from about 0.1% to about 35%, from about 0.5% to about 30%, from about 1% to about 25%, from about 2% to about 20%, or from about 3% to about 15% by weight;
c) one or more compatibilizers for improving the compatibility of the modified white colorant with the one or more binder resins, wherein a weight ratio of the one or more compatibilizers to the one or more binder resins is ranging from about 1 to about 20, from about 1 to about 15, from about 1 to about 10, from about 1 to about 8, from about 1 to about 6, from about 1 to about 4, from about 1 to about 2, or from about 1 to about 1;
d) one or more ink solvents in an amount from about 30% to about 90%, from about 40% to about 85%, from about 50% to about 85%, from about 50% to about 80%, or from about 50% to about 70% by weight; and
e) optionally one or more additives.

In some embodiments, the inkjet ink compositions disclosed herein have viscosities ranging from about 1 mPa·s to about 25 mPa·s, from about 2 mPa·s to about 10 mPa·s, or from about 2.5 mPa·s to about 5.5 mPa·s. In certain embodiments, the inkjet ink compositions disclosed herein have electrical conductivities higher than 300 µS/cm, higher than about 400 µS/cm, higher than about 500 µS/cm, higher than about 600 µS/cm, higher than about 800 µS/cm, or higher than about 1000 µS/cm at 20° C.

The optional one or more additives may be added to the ink formulation to provide extra security of printing marks under any kinds of any physical or chemical trigger, for example fluorescent dye, rare earth elements so that the ink becomes visible under weak UV and IR irradiation. In some embodiments, the optional one or more additives is less than about 2%, or from about 0.05% to about 0.8% by weight, based on the total weight of the inkjet ink composition.

The inkjet ink composition can be prepared by any suitable method, for example, by mixing all required ingredients at room temperature or an elevated temperature; and then filtering the ink solution to remove any undesirable materials.

In some embodiments, the inkjet ink composition comprises:
(i) one or more compatibilizers disclosed herein, wherein a weight ratio of compatibilizer to binder resins is ranging from 1 to 20;
(ii) one or more white colorants disclosed herein in an amount from 1% to 30% by weight;
(iii) one or more ink solvents disclosed herein in an amount from 45% to 75% by weight;
(iv) one or more binder resins disclosed herein in an amount from 0.1% to 20% by weight; and
(v) one or more additives disclosed herein in an amount from 0.1% to 2% by weight.

In some embodiments, the substrate comprises one or more polymers or a coating comprising one or more polymers. Some non-limiting examples of polymers include thermoplastics, thermosets and elastomers. In certain embodiments, the substrate is nonporous. In other embodiments, the substrate is pliable or moldable. In certain embodiments, the polymer is selected from the group consisting of polyolefins such as low density poly(ethylene) (LDPE), high density poly(ethylene) (HDPE), crosslinked poly(ethylene) (XLPE) and poly(propylene); ethylene vinyl acetate copolymers; polyethers such as poly(phenyl ether); styrenic polymers such as polystyrene, poly(methyl styrene); polyacrylates such as poly(methyl methacrylate), poly (butyl methacrylate); chlorinated polymers such as poly (vinyl chloride), poly(vinylidene chloride); polycarbonates; epoxy resins and combinations thereof.

The substrate can be in the form of a film, a laminate, a molded article, an extruded article, or a package material. The molded article or the extruded article can be selected from toys, grips, soft touch handles, bumper rub strips, floorings, auto floor mats, wheels, casters, furniture and appliance feet, tags, seals, gaskets, automotive doors, bumper fascia, grill components, rocker panels, hoses, linings, PVC pipes, office supplies, liners, diaphragms, tubes, lids, stoppers, plunger tips, delivery systems, kitchen wares, shoes, shoe bladders, and shoe soles. The package material can be for consumer products such as dairy products, beverages, snacks, food products, plastic bottles, PVC cable, electrical wirings, and optical fibers.

In certain embodiments, the printing with the inkjet ink composition disclosed herein is done by using an inkjet printer such as a continuous inkjet printer in a production line. In some embodiments, the speed of the production line is from about 30 to about 50 meter/minute, from about 20 to about 60 meter/minute, from about 30 to about 50 meter/minute, or from about 35 to about 45 meter/minute. In some embodiments, the speed of the production line is at more than 10 meter/minute, more than 20 meter/minute, more than 30 meter/minute, more than 40 meter/minute, or more than 50 meter/minute.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The examples below demonstrate some embodiments of the compatibility studies in accordance with the present invention.

Preparation of SMA-stabilized pigment concentrates

Four pigment concentrates were prepared by first dissolving four different types of SMA copolymer resins (20 g) in methyl ethyl ketone (40 g) as a solvent to form a resin solution of SMA 1000, SMA 1440, SMA 2625, and EF-60, respectively. After each of the SMA copolymer resin was completely dissolved, a total of 40 g $TiO_2$ pigment was slowly added to the resin solution under a high shear mixing in order to disperse the titanium dioxide pigment (commercially obtained from Kronos Worldwide, Inc.), followed by further mixing for 30 minutes to form the corresponding pigment concentrates.

Preparation of Inkjet Ink Compositions and Determination of their Dispersion Stability A 30 g of an inkjet ink composition, wherein the compositions comprise 10 wt. % $TiO_2$, 5 wt. % SMA copolymer resins, and 6 wt. % binder resin, was prepared by slowly adding either a solvent or a binder resin solution comprising one or more binder resins into the pigment concentrates under stirring at 5000 rpm for 30 min. The dispersion stability of the inkjet ink compositions was then evaluated by first allowing the ink compositions to settle for 24 hours at 25° C., followed by extracting their supernatant for subsequent pigment content determination. The pigment content of the supernatant was determined using a ASTM D2698-05 Standard Test Method for Determination of the Pigment Content of Solvent-Reducible Paints by High-Speed Centrifugation.

The dispersion stability of the inkjet ink composition was expressed by calculating the ratio of pigment content in the supernatant after 24 hours ($p_{24}$) over the initial pigment content ($p_0$=10 wt. %). The dispersion stability was ranked according to ratings A, B, PS as shown below:
- A: The pigment content of the supernatant after 24 hours ($p_{24}$) is greater than or equal to 80% of the initial pigment content ($p_0$);
- B: The pigment content of the supernatant after 24 hours ($p_{24}$) is less than 80% but greater than 40% of the initial pigment content ($p_0$);
- PS: The pigment content of the supernatant after 24 hours ($p_{24}$) is less than or equal to 40% of the initial pigment content ($p_0$)

Preparation of SMA-Stabilized Pigment Concentrates for Compatibility Study

Four pigment concentrates were prepared from four SMA copolymer resins (i.e., SMA 1000, SMA 1440, SMA 2625, and EF-60, all of which commercially obtained from Cray Valley in Exton, Pennsylvania) respectively. Each pigment concentrate was prepared by first dissolving 20 g of a SMA copolymer resin (SMA 1000, SMA 1440, SMA 2625, or EF-60) in 40 g of methyl ethyl ketone (MEK). After the SMA copolymer resin was completely dissolved to form a resin solution, a total of 40 g of $TiO_2$ pigment (TRONOX® CR-828 from Tronox, Oklahoma City, Oklahoma) was slowly added to the resin solution while the resin solution was stirred using a high shear mixer to disperse the titanium dioxide pigment. After the addition of $TiO_2$ pigment was completed, the mixture was further mixed for 30 minutes to form the pigment concentrate (SMA 1000-pigment concentrate, SMA 1440-pigment concentrate, SMA 2625-pigment concentrate, or EF-60-pigment concentrate).

Comparative Example C1-C4

Comparative Examples C1-C4 illustrate the dispersion stability of 4 different types of SMA surfactant-stabilized $TiO_2$ (i.e., SMA 1000, SMA 1440, SMA 2625, and EF-60, all of which commercially obtained from Cray Valley (Exton, Pennsylvania)) in methyl ethyl ketone (MEK) as a solvent, in the absence of any compatibilizer and binder resin. Each of Comparative Examples C1-C4 was prepared by slowly adding MEK into a pigment concentrate (SMA 1000-pigment concentrate, SMA 1440-pigment concentrate, SMA 2625-pigment concentrate, or EF-60-pigment concentrate) respectively under stirring at 5000 rpm for 30 minutes. Each of the Comparative Examples C1-C4 contained 10 wt. % $TiO_2$, 5 wt. % SMA copolymer, and 85 wt. % MEK. The dispersion stability data of Comparative Examples C1-C4 are shown in Table 1 below and FIG. 1.

TABLE 1

The dispersion stability of Comparative Examples C1-C4 in the absence of both compatibilizer and binder resins.

| | Comparative Examples | | | |
|---|---|---|---|---|
| | C1 SMA 1000 | C2 SMA 1440 | C3 SMA 2625 | C4 EF-60 |
| Dispersion stability | PS | B | B | PS |

Examples 1-4

Examples 1-4 illustrate the dispersion stability of inkjet ink compositions comprising a SMA surfactant-stabilized $TiO_2$ and a binder resin. No compatibilizer was added. Each of Examples 1-4 was prepared by dissolving a respective binder resin according to the Table 2 in an appropriate amount of methyl ethyl ketone to form a binder solution, and then adding slowly the binder solution into a pigment concentrate (i.e., SMA 1000-pigment concentrate, SMA 1440-pigment concentrate, SMA 2625-pigment concentrate, or EF-60-pigment concentrate) respectively under stirring at 5000 rpm for 30 minutes. Each of Examples 1-4 contained 10 wt. % $TiO_2$, 5 wt. % SMA copolymer, 6 wt. % binder resin, and 79 wt. % MEK. The dispersion stability data of Examples 1-4 are shown in Table 2 below.

TABLE 2

The dispersion stability of Examples 1-4 (no compatibilizer)

| | EXAMPLES 1-4 | | | |
|---|---|---|---|---|
| Binder Resin | 1 SMA 1000 | 2 SMA 1440 | 3 SMA 2625 | 4 EF-60 |
| Vinnol H 14/36 | PS | PS | PS | PS |
| Laroflex MP-45 | PS | PS | B | A |
| Paraloid B-66 | PS | B | PS | PS |
| NeoCryl B-810 | PS | B | PS | PS |
| NeoCryl B-814 | PS | B | A | B |
| Kurarity LA4285 | PS | PS | PS | PS |
| NeoCryl B-731 | PS | PS | A | B |

Examples 5-8

Examples 5-8 illustrate the dispersion stability of inkjet ink compositions comprising a SMA surfactant-stabilized $TiO_2$, a CAB-553-0.4 as a compatibilizer, and a binder resin. Each of Examples 5-8 was prepared by dissolving compatibilizer CAB-553-0.4 and a respective binder resin according to Table 3 below in an appropriate amount of methyl ethyl ketone to form a binder solution, and then adding slowly the binder solution into a pigment concentrate (SMA 1000-pigment concentrate, SMA 1440-pigment concentrate, SMA 2625-pigment concentrate, or EF-60-pigment concentrate) respectively under stirring at 5000 rpm for 30 minutes. Each of Examples 5-8 contained 10 wt. % $TiO_2$, 5 wt. % SMA copolymer, 0.6 wt. % compatibilizer, 6 wt. % binder resin, and 78.4 wt. % MEK. The dispersion stability data of Examples 5-8 are shown in Table 3.

TABLE 3

The dispersion stability of Examples 5-8 (CAB-553-0.4 as a compatibilizer).

| | | Examples 5-8 | | | |
|---|---|---|---|---|---|
| | Resins | SMA 1000 | SMA 1440 | SMA 2625 | EF 60 |
| Compatibilizer | CAB-553-0.4 | 2 wt. % | 0.6 wt. % | 0.6 wt. % | 0.6 wt. % |
| Binder Resins (6%) | Vinnol H 14/36 | PS | A | A | PS |
| | Laroflex MP-45 | PS | A | A | A |
| | Paraloid B-66 | A | A | A | A |
| | NeoCryl B-810 | A | A | B | B |
| | NeoCryl B-814 | A | A | B | A |
| | Kurarity LA4285 | B | A | A | B |
| | NeoCryl B-731 | A | A | A | B |

FIGS. 2-5 summarize the dispersion stability of Examples 1-8. The dispersion stability data in FIGS. 2-5 show that the addition of a compatibilizer significantly improves the compatibility between the SMA-stabilized $TiO_2$ and the binder resins.

Examples 9-13

Examples 9-13 illustrate the effect of different types of compatibilizers on the dispersion stability of a SMA surfactant-stabilized $TiO_2$ in MEK with different compatibilizers and different binder resins. Each of Examples 9-13 was prepared by dissolving a respective compatibilizer and a respective binder resin according to Table 4 in an appropriate amount of methyl ethyl ketone to form a binder solution, and then adding slowly the binder solution into a pigment concentrate under stirring at 5000 rpm for 30 minutes. Each of Examples 9-13 contained 10 wt. % $TiO_2$, 5 wt. % SMA copolymer, 0.6 wt. % compatibilizer, 6 wt. % binder resin, and 78.4 wt. % MEK. The dispersion stability data of Examples 9-13 are shown in Table 4.

TABLE 4

Effect of different types of compatibilizers on the dispersion stability of Examples 9-13.

| | EXAMPLES 9-13 | | | | |
|---|---|---|---|---|---|
| | 9<br>CAP-482-0.5 | 10<br>CAP-504.0.2 | 11<br>CAB-553-0.4 | 12<br>Solbin A | 13<br>CAB-553-0.4 + Solbin A<br>(1:1 w/w) |
| Hydroxyl content (%) | 2.6 | 5.0 | 4.8 | 2.6 | 3.7 (total) |
| Vinnol H 14/36 | PS | A | A | PS | A |
| Laroflex MP-45 | B | A | A | A | A |
| Paraloid B-66 | B | A | A | B | B |
| NeoCryl B-810 | B | A | A | B | A |
| NeoCryl B-814 | A | A | A | A | A |
| Kurarity LA4285 | A | A | A | PS | A |
| NeoCryl B-731 | A | A | A | PS | A | dispersion was finally filtered to remove any precipitates using a filtration setup fitted with a 0.5 μm Pall filter.

TABLE 5

The compositions of Examples 14-18.

| | Example | | | | |
|---|---|---|---|---|---|
| | 14 | 15 | 16 | 17 | 18 |
| $TiO_2$ (%)[1] | 12.5 | 12.5 | 15 | 12 | 15 |
| SMA1440 (%) | 5 | 4.17 | 6 | 8 | |
| SMA1000(%) | | | | | 4.5 |
| CAB-553-0.4 (%) | 2 | 1.5 | 1.5 | 1 | 1.5 |
| Solbin A (%) | | | | | |
| Vinnol H 14/36 (%) | | | | | |
| Laroflex MP-45 (%) | | | | | |
| Neocryl B-810 (%) | | | | | |
| NeoCryl B-811 (%)[2] | | | | | |
| Degalan LP66/02 (%) | 10 | | 4.5 | 3.5 | 3 |
| Paraloid B-66 (%) | | | | 3 | |
| Paraloid B-82 (%) | | 6 | | | |

Examples 14-18

Examples 14-18 are inkjet ink formulations for illustrating the effect of compatibilizers on the properties of inkjet ink formulations with respect to their conductivity, viscosity, dispersion stability, printing stability, long-term stability, transfer resistance, and whiteness. Each of Examples 14-18 was prepared by dissolving a respective compatibilizer and a respective binder resin according to Table 5 in an appropriate amount of methyl ethyl ketone to form a binder solution, and then adding slowly the binder solution into an appropriate amount of SMA 1440-pigment concentrate under stirring at 5000 rpm for 30 minutes. The resulting ink TABLE 5-continued The compositions of Examples 14-18.

| | Example | | | | |
|---|---|---|---|---|---|
| | 14 | 15 | 16 | 17 | 18 |
| Paraloid B-99N (%) | | | | | 3 |
| Paraloid DM-55 (%) | | | | | 1.5 |
| Additives (%)[4] | 2 | 1.6 | 1.5 | 1.8 | 2 |

The conductivity of each of Examples 14-18 was measured by a conductivity meter (Thermo Scientific Orion Star A212 Conductivity Benchtop Meter with Orion DuraProbe 4-Electrode Conductivity Cells) using 100 g of the example. The conductivity meter was calibrated by both a 84 μS/cm standard solution and a 1,413 μS/cm standard solution before the measurement.

The viscosity of each of Examples 14-18 was measured according to Lubrizol Test No. AATM105Ab using a Brookfield viscometer (DVII+ pro).

The printing stability of each of Examples 14-18 was conducted by continuously jetting the inkjet ink for 8 hours per day at a line speed of 45 meter per minute for 15 days with an inkjet printer (Leibinger Jet3up PI printer), wherein the gutter remains open and no gutter cleaning is allowed throughout the study. The printing stability of each of Examples 14-18 was evaluated by directly observing the test image printed everyday by the inkjet printer. The prints were classified into the following two catalogues:

A: Successfully printed at intended sites.
B: Not printed at intended sites with print defects due to nozzle clogging.

The long-term stability of each of Examples 14-18 was evaluated by observing how long the ink can run without encountering the high voltage error during standby mode in 15 days.

Y: High voltage error occurs due to suffering from serious ink deposition on high voltage deflection plates or deviation of the ink line (Duration of running before high voltage error will be recorded).
N: No high voltage error occurs.

A mark such as a pattern or image or information was printed on a single or multi-layered polymer substrate thereof with each of Examples 14-18 using a continuous inkjet printer at a line speed of 45 meter/minute.

The transfer resistance of each of Examples 14-18 was evaluated by printing the inkjet ink composition on a polyvinylchloride cable with a length of 5 cm and a width of 0.5 cm. After treating for 30 second at room temperature, the cable was pressed by another cable with the same length without marking, followed by bundling the two cables by wrapping with a polyethylene wrap. Subsequently, the bundled cables were pressed under a constant weight of 500 g and placed the cables in a 50° C. oven. After 24 hours, the bundled cables were withdrawn from the oven, followed by checking whether there was transferring of the mark to another cable via unaided eye under an inspection site with light illumination at room temperature.

Y: Ink transfer occurs from one cable to another cable
N: No ink transfer occurs The whiteness was determined by the lightness value L* of a dried ink sample and measured using a spectrophotometer based on the CIE 1964 LAB (10°) standard observer under D65 illuminant condition, where the inkjet ink was applied at a fixed volume (0.1 mL) on a black tile with lightness value L*=10 (a*=0, b*=0) and dried at 25° C. for 1 hour. A lightness value L*=100 indicates maximum lightness in the scale, and L*=0 indicates minimal lightness. The lightness enhancement percentage is calculated by the percentage increase of the lightness of an inkjet ink composition with and without compatibilizer.

Table 6 shows the conductivity, viscosity, dispersion stability, printing stability, long term stability, transfer resistance, and whiteness of Examples 14-18.

TABLE 6

The properties of Examples 14-18.

| Property | Example 14 | 15 | 16 | 17 | 18 |
|---|---|---|---|---|---|
| Conductivity (μS/cm) at 25° C. | 1,389 | 1,465 | 1,512 | 1,762 | 1,733 |
| Viscosity (mPa · s) at 25° C. | 8.9 | 5.7 | 6.5 | 7.8 | 6.6 |
| Dispersion stability (with compatibilizer/without compatibilizer) | A/PS | A/B | A/B | A/PS | B/PS |
| Printing stability | A | A | A | A | B |
| Long term stability (15 days) | N | N | N | N | Y |
| Transfer resistance | N | N | N | N | N |
| Lightness L* enhancement (%) | +2.1 | +8.0 | +4.1 | +1.0 | +1.9 |

Examples 14-18 clearly indicate that addition of a compatibilizer produces the white inkjet ink with better dispersion stability and whiteness. Examples 14-18 also show excellent printing stability and transfer resistance on non-porous packaging materials such as PVC cables.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:
1. An inkjet ink composition comprising:
a) a white colorant selected from the group consisting of bare titanium dioxide, bare zinc oxide, surface treated titanium dioxide, surface treated zinc oxide and combinations thereof, wherein the white colorant is modified with a functional copolymer to form a modified white colorant, and wherein the functional copolymer comprises an acid group;
b) one or more binder resins, wherein the one or more binder resins are present in an amount more than 3 wt. %, based on the total weight of the inkjet ink composition;
c) one or more compatibilizers for improving the compatibility of the modified white colorant with the one or more binder resins, wherein the one or more compatibilizers comprise hydroxy groups and wherein the hydroxy content is from about 2.5% to about 8% by weight, based on the total weight of the compatibilizers;

d) an ink solvent; and e) optionally one or more additives.

2. The inkjet ink composition of claim 1, wherein the functional copolymer is a styrene-maleic anhydride copolymer.

3. The inkjet ink composition of claim 1, wherein the average diameter of the white colorant is from about 150 nm to about 500 nm.

4. The inkjet ink composition of claim 1, wherein the white colorant is surface treated titanium dioxide, surface treated zinc oxide, or a combination thereof.

5. The inkjet ink composition of claim 4, wherein the average diameter of the white colorant is less than about 400 nm.

6. The inkjet ink composition of claim 1, wherein the one or more compatibilizers comprise cellulose acetate propionate, cellulose acetate butyrate, vinyl chloride-vinyl acetate copolymer or a combination thereof.

7. The inkjet ink composition of claim 1, wherein the one or more compatibilizers comprise hydroxy groups and wherein the hydroxy content is from about 3% to about 6% by weight, based on the total weight of the compatibilizers.

8. The inkjet ink composition of claim 1, wherein the one or more compatibilizers are present in an amount from about 0.1% to about 10% by weight, or from about 0.1% to about 5% by weight, based on the total weight of the inkjet ink composition.

9. The inkjet ink composition of claim 1, wherein the one or more binder resins have at least one functional or polar group to act as a co-stabilizer to disperse the white colorant, and wherein the one or more binder resins are different from the one or more compatibilizers.

10. The inkjet ink composition of claim 1, wherein the weight ratio of the one or more compatibilizers to the one or more binder resins is from about 1:1 to about 1:20, from about 1:1 to about 1:15, or from about 1:1 to about 1:10.

11. The inkjet ink composition of claim 1, wherein the white colorant is present in an amount from about 0.1% to about 30% by weight, or from about 1% to about 25% by weight, or from about 5% to about 20% by weight, based on the total weight of the inkjet ink composition.

12. The inkjet ink composition of claim 1, wherein the ink solvent is selected from the group consisting of one or more ketones, one or more alcohols, one or more esters, and combinations thereof, or the ink solvent comprises a mixture of methyl ethyl ketone, ethyl acetate and ethanol.

13. The inkjet ink composition of claim 1, wherein the ink solvent is present in an amount from about 50% to about 85% by weight, or from about 65% to about 80% by weight, based on the total weight of the inkjet ink composition.

14. The inkjet ink composition of claim 1, wherein the optionally one or more additives are selected from the group consisting of plasticizers, surfactants, light stabilizers, defoaming agents, antioxidants, UV stabilizers, bactericides, pH control agents, conducting agents, rub resistance agents, and combinations thereof.

15. The inkjet ink composition of claim 1, wherein the optionally one or more additives comprise one or more plasticizers for solubilizing the binder.

16. A method of making a print on a substrate by jetting the print on the substrate with an inkjet printer using an inkjet ink composition of claim 1; and drying the print.

17. The method of claim 16, wherein the substrate is a first nonporous substrate and wherein the print on the first nonporous substrate is not substantially transferred to a second nonporous substrate after the first nonporous substrate and the second nonporous substrate with the print between the first and second substrates are bundled by wrapping with a polyethylene wrap and then pressed under a load of 500 g at 50° C. for 24 hours.

18. The method of claim 17, wherein the amount of the print transferred from the first nonporous substrate to the second nonporous substrate is less than 1% of the print by weight or area.

19. The method of claim 17, wherein each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

* * * * *